United States Patent
Hara et al.

(10) Patent No.: US 7,220,702 B2
(45) Date of Patent: *May 22, 2007

(54) EXHAUST GAS PURIFICATION CATALYST

(75) Inventors: Naoyuki Hara, Toyota (JP); Ichiro Hachisuka, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 233 days.

This patent is subject to a terminal disclaimer.

(21) Appl. No.: 10/468,354

(22) PCT Filed: Feb. 4, 2002

(86) PCT No.: PCT/JP02/00900

§ 371 (c)(1),
(2), (4) Date: Nov. 3, 2003

(87) PCT Pub. No.: WO02/066155

PCT Pub. Date: Aug. 29, 2002

(65) Prior Publication Data

US 2004/0077495 A1    Apr. 22, 2004

(30) Foreign Application Priority Data

Feb. 19, 2001 (JP) ............................... 2001-41714
Apr. 3, 2001 (JP) ............................. 2001-104322
Aug. 8, 2001 (JP) ............................. 2001-240616

(51) Int. Cl.
*B01J 23/00* (2006.01)
*B01J 21/00* (2006.01)
*B01J 20/00* (2006.01)

(52) U.S. Cl. ............. 502/327; 502/302; 502/303; 502/304; 502/328; 502/330; 502/332; 502/333; 502/334; 502/339; 502/349; 502/350; 502/351; 502/355; 502/415; 502/439; 502/527.12; 502/527.13

(58) Field of Classification Search ........ 502/302–304, 502/327, 328, 330, 332–334, 339, 349–351, 502/355, 415, 439, 527.12, 527.13
See application file for complete search history.

(56) References Cited

U.S. PATENT DOCUMENTS 5,597,771 A * 1/1997 Hu et al. .................. 502/304

(Continued)

FOREIGN PATENT DOCUMENTS

EP    0 657 204 A1    6/1995

(Continued)

*Primary Examiner*—Cam N. Nguyen
(74) *Attorney, Agent, or Firm*—Oliff & Berridge, PLC

(57) ABSTRACT

A noble metal and an $NO_x$ sorption member are loaded on a support which includes composite particles having a structure including a core portion in which $ZrO_2$ is a major component and a superficial portion formed on a surface of the core portion and including an oxide, whose basicity is lower than $ZrO_2$, more than the core portion. The composite particles exhibit a high basicity at the inside and a low basicity on the surface by $Al_2O_3$ or $TiO_2$ which exists more in the surface. Accordingly, the sulfur-poisoning resistance is improved, and, at the same time, the post-durability $NO_x$ purifying ability is improved.

18 Claims, 6 Drawing Sheets

U.S. PATENT DOCUMENTS

| | | | |
|---|---|---|---|
| 5,804,152 A | 9/1998 | Miyoshi et al. | |
| 6,025,297 A | 2/2000 | Ogura et al. | |
| 6,159,897 A | 12/2000 | Suzuki et al. | |
| 6,165,429 A | 12/2000 | Ikeda et al. | |
| 6,261,989 B1 * | 7/2001 | Tanaka et al. | 502/217 |
| 6,335,305 B1 * | 1/2002 | Suzuki et al. | 502/325 |
| 6,391,276 B1 * | 5/2002 | Suda et al. | 423/598 |
| 6,426,316 B2 * | 7/2002 | Tanaka et al. | 502/340 |
| 6,440,378 B1 * | 8/2002 | Hirata et al. | 423/239.1 |
| 6,500,392 B2 * | 12/2002 | Mizuno et al. | 422/177 |
| 6,537,511 B1 * | 3/2003 | Chattha et al. | 423/213.5 |
| 6,649,133 B1 * | 11/2003 | Hasegawa et al. | 423/239.1 |
| 6,806,225 B1 | 10/2004 | Ikeda et al. | |
| 6,841,511 B2 * | 1/2005 | Kaneeda et al. | 502/330 |
| 6,852,665 B2 | 2/2005 | Morikawa et al. | |
| 6,926,875 B2 * | 8/2005 | Hatanaka et al. | 423/239.1 |

FOREIGN PATENT DOCUMENTS

| | | |
|---|---|---|
| EP | 0 707 882 A1 | 4/1996 |
| EP | 0 852 966 A1 | 7/1998 |
| EP | 0 992 276 A1 | 4/2000 |
| EP | 0 993 860 A1 | 4/2000 |
| EP | 1 036 767 A1 | 9/2000 |
| EP | 1 175 935 A2 | 1/2002 |
| JP | A 5-168860 | 7/1993 |
| JP | A 5-168924 | 7/1993 |
| JP | A 5-195755 | 8/1993 |
| JP | A 5-317625 | 12/1993 |
| JP | A 5-317652 | 12/1993 |
| JP | A 6-31139 | 2/1994 |
| JP | A 8-99034 | 4/1996 |
| JP | A 8-117602 | 5/1996 |
| JP | A 9-926 | 1/1997 |
| JP | A 9-24247 | 1/1997 |
| JP | A 9-24274 | 1/1997 |
| JP | A 9-192487 | 7/1997 |
| JP | A 10-356 | 1/1998 |
| JP | 10-258232 | 9/1998 |
| JP | 11-076838 | 3/1999 |
| JP | 11-138021 | 5/1999 |
| JP | A 11-197503 | 7/1999 |
| JP | A 11-262666 | 9/1999 |
| JP | A 2000-189798 | 7/2000 |
| JP | A 2001-9279 | 1/2001 |
| JP | 2002-331238 | 11/2002 |

* cited by examiner

Al Addition Amount (% by mol)

Al Addition Amount (% by mol)

EXHAUST GAS PURIFICATION CATALYST

TECHNICAL FIELD

The present invention relates to an $NO_x$ sorption-and-reduction type catalyst for purifying an exhaust gas, more particularly to a catalyst for purifying an exhaust gas which can reveal a high $NO_x$ purifying ability for a long period of time by suppressing sulfur poisoning.

BACKGROUND ART

Recently, as a catalyst for purifying $NO_x$ in an exhaust gas of an oxygen-excessive lean atmosphere, an $NO_x$ sorption-and-reduction type catalyst has been utilized. This $NO_x$ sorption-and-reduction type catalyst, for example, as disclosed in Japanese Unexamined Patent Publication (KOKAI) No. 5-317,625, is one in which a noble metal, such as Pt and Rh, and an $NO_x$ sorption member, such as K and Ba, are loaded on a porous support, such as $Al_2O_3$. By using this $NO_x$ sorption-and-reduction type catalyst and controlling an air-fuel ratio from a lean side to a stoichiometric as well as rich side in a pulsating manner (rich spiking), since an exhaust gas, too, becomes from a lean atmosphere to a stoichiometric as well as rich atmosphere, $NO_x$ are sorbed in the $NO_x$ sorption member on the lean side, and they are released on the stoichiometric or rich side to react with reductive components, such as HC and CO, so that they are purified. Therefore, even when it is an exhaust gas from a lean burn engine, it is possible to purify $NO_x$ with good efficiency. Moreover, since HC and CO in the exhaust gas are oxidized by the noble metal and, at the same time, are consumed in the reduction of $NO_x$, HC as well as CO are also purified with good efficiency.

For example, in Japanese Unexamined Patent Publication (KOKAI) No. 5-317,652, a catalyst for purifying an exhaust gas is proposed in which an alkaline-earth metal, such as Ba, and Pt are loaded on a porous oxide support, such as $Al_2O_3$. Further, in Japanese Unexamined Patent Publication (KOKAI) No. 6-31,139, a catalyst for purifying an exhaust gas is proposed in which an alkali metal, such as K, and Pt are loaded on a porous oxide support, such as $Al_2O_3$. Furthermore, in Japanese Unexamined Patent Publication (KOKAI) No. 5-168,860, a catalyst for purifying an exhaust gas is proposed in which a rare-earth element, such as La, and Pt are loaded on a porous oxide support, such as $Al_2O_3$.

However, in an exhaust gas, $SO_2$, which is generated by burning sulfur (S) contained in a fuel, is included, and it is oxidized by a noble metal in an exhaust gas of a lean atmosphere so that it is turned into $SO_3$. Then, it has become apparent that it is readily turned into sulfuric acid by water vapor, which is also contained in the exhaust gas, that these react with the $NO_x$ sorption member to generate sulfites and sulfates, and that the $NO_x$ sorption member is thereby poisoned to degrade. This is referred to as the sulfur poisoning of the $NO_x$ sorption member. Moreover, since the porous oxide support, such as $Al_2O_3$, has a property that it is likely to adsorb $SO_x$, there is a problem in that the aforementioned sulfur poisoning has been facilitated. Then, when the $NO_x$ sorption member is thus turned into sulfites and sulfates so that it is poisoned to degrade, it can no longer sorb $NO_x$, as a result, there is a drawback in that the $NO_x$ purifying performance lowers after a high-temperature durability test (hereinafter, referred to as "post-durability").

Moreover, it has been understood that another cause, by which the post-durability $NO_x$ purifying ability is lowered, lies in that a reaction occurs between cordierite, which has been used as a support substrate in general, and an alkali component, which works as the $NO_x$ sorption member, and thereby the $NO_x$ sorption ability has been lowered.

Namely, the alkali component is likely to move in a coating layer, such as $Al_2O_3$, and simultaneously exhibits a high reactivity to Si. Accordingly, it is believed that the alkali component moves in the coating layer when the temperature is high, arrives at the support substrate and reacts with Si in cordierite to form silicate, being a composite oxide. Since this silicate is a stable compound, the alkali component, which has been turned into silicate, no longer has an ability of sorbing $NO_x$, and accordingly the $NO_x$ purifying performance has been lowered.

Moreover, it was thought of using a $TiO_2$ support, and an experiment was carried out. As a result, since $SO_x$ flowed as they were to downstream without being adsorbed onto $TiO_2$, and since only $SO_2$, which contacted directly with a noble metal, was oxidized, it became apparent that the extent of sulfur poisoning was less. However, in a $TiO_2$ support, the initial activity is low, moreover, since $TiO_2$ reacts to an alkali component to generate titanates, it has become apparent that the post-durability $NO_x$ purifying performance is kept being low. Hence, in Japanese Unexamined Patent Publication (KOKAI) No. 8-099,034, there is proposed to use a composite support comprising $TiO_2$—$Al_2O_3$. Moreover, it has been proposed to use a support in which rutile type $TiO_2$ is added to $Al_2O_3$. However, even when a support made of composite oxide on made by thus adding $TiO_2$ is used, it is difficult to suppress the reaction between an alkali component and $TiO_2$.

While, in Japanese Unexamined Patent Publication (KOKAI) No. 8-117,602, an $NO_x$ sorption-and-reduction type catalyst is proposed in which a Ti—Zr composite oxide, an $NO_x$ sorption member and a noble metal are loaded on an $Al_2O_3$ support.

By thus making a composite support in which a Ti—Zr composite oxide is loaded on $Al_2O_3$, it is possible to highly maintain the initial $NO_x$ purifying rate due to the advantage of $Al_2O_3$. Moreover, by loading a Ti—Zr composite oxide, it is possible to raise the acidity of the support itself. Therefore, since this composite support, compared with the case where $Al_2O_3$ is used alone, is less likely to adsorb $SO_x$, and since adsorbed $SO_x$ are likely to eliminate at a low temperature, the contacting probability between the $NO_x$ sorption member and $SO_x$ is lowered. In addition, in a support on which a Ti—Zr composite oxide is loaded, it is believed that the movement of alkali component is suppressed, and it has been understood that the reaction of the alkali component to $TiO_2$ is suppressed. Therefore, when the aforementioned composite support is used, a high $NO_x$ purifying rate is secured even in the initial period, since the sulfur poisoning as well as the solving of the alkali metal into the support are suppressed, a post-durability $NO_x$ purifying rate is improved.

However, in a catalyst in which a Ti—Zr composite oxide is loaded on an $Al_2O_3$ support, compared with a composite support comprising $TiO_2$—$Al_2O_3$ as disclosed in Japanese Unexamined Patent Publication (KOKAI) No. 8-099,034 or a catalyst which uses a support in which $TiO_2$ is added to $Al_2O_3$, it is not possible to say that the suppression effect of the sulfur poisoning is sufficient, and accordingly it has been required to further suppress the sulfur poisoning and improve the $NO_x$ purifying rate.

Moreover, due to the recent improvement of engine performance, the increase of high speed driving, and the like, the temperature of exhaust gas has risen so that the improvement of $NO_x$ purifying activity in a high temperature region has become an assignment. This is because, in a high temperature region, $NO_x$, which have been sorbed in an $NO_x$ sorption member, are likely to be released, and the $NO_x$ sorption amount is likely to be insufficient in a lean atmosphere. Hence, K, which exhibits a high basicity and is stable at a high temperature, is made into an $NO_x$ sorption member, but, in a catalyst in which K is loaded on $Al_2O_3$, and so on, there has been a problem in that the $NO_x$ sorption ability in a high temperature region is not improved so much.

Hence, it was thought of using a support which exhibits a higher basicity, and, in Japanese Unexamined Patent Publication (KOKAI) No. 5-195,755, a catalyst is disclosed in which K and a noble metal are loaded on $ZrO_2$. In accordance with this catalyst, since the basicities of the support and $NO_x$ sorption member are high, it is likely to sorb but less likely to release $NO_x$. Therefore, the $NO_x$ sorption ability in a high temperature region is improved, as a result, the $NO_x$ purifying performance in a high temperature region is improved.

However, in the catalyst in which K and a noble metal are loaded on $ZrO_2$, since the basicity of the support is high, there has been a drawback in that it is likely to sorb not only $NO_x$ but also $SO_x$ so that the lowering of the activity by the sulfur poisoning is considerable. Namely, when the basicity of a support is high, although the $NO_x$ sorption ability is improved, even the sulfur poisoning is facilitated. On the contrary, when the basicity of a support is low, although the sulfur poisoning is suppressed, even the $NO_x$ sorption ability is lowered.

The present invention has been done in view of such circumstances, it is a main object to further suppress the sulfur poisoning of an $NO_x$ sorption-and-reduction type catalyst, thereby furthermore improving the high-temperature post-durability $NO_x$ purifying rate.

Moreover, the second object of the present invention is to make a catalyst which can satisfy both of the contradictory phenomena, such as the improvement of the $NO_x$ sorption ability in a high temperature region and the suppression of the sulfur poisoning, and which is good in terms of the heat resistance.

The characteristic of a catalyst for purifying an exhaust gas, of an $NO_x$ sorption-and-reduction type catalyst comprising a noble metal and an $NO_x$ sorption member loaded on a porous oxide support, which solves the aforementioned assignments and is set forth in claim 1, lies in that the porous oxide support includes composite particles having a structure comprising a core portion in which $ZrO_2$ is a major component and a superficial portion formed on a surface of the core portion and including an oxide, whose basicity is lower than $ZrO_2$, more than the core portion.

Moreover, the characteristic of a catalyst for purifying an exhaust gas, of an $NO_x$ sorption-and-reduction type catalyst comprising a support substrate, a coating layer formed on the support substrate and comprising a porous oxide, a noble metal loaded on the coating layer and at least one $NO_x$ sorption member loaded on the coating layer and selected from the group consisting of alkali metals, alkaline-earth metals and rare-earth elements, which solves the aforementioned assignments and is set forth in claim 9, lies in that composite particles, having a structure comprising a core portion in which $ZrO_2$ is a major component and a superficial portion formed on a surface of the core portion and including an oxide, whose basicity is lower than $ZrO_2$, more than the core portion, are included in the coating layer.

In the present catalyst for purifying an exhaust gas, it is preferred that the oxide, whose basicity is lower than $ZrO_2$, can be $Al_2O_3$, and that the composite particles can be a $ZrO_2$—$Al_2O_3$ composite oxide. In this case, a composition of the composite particles can desirably fall in a range of $Al_2O_3/ZrO_2=3/97$–$15/85$ by molar ratio.

Further, it is preferred that the oxide, whose basicity is lower than $ZrO_2$, can be $TiO_2$, and that the composite particles can be a $ZrO_2$—$TiO_2$ composite oxide. In this case, $TiO_2$ can desirably be included in an amount of 30% by weight or more in the superficial portion of the composite particles. Furthermore, the composite particles can desirably further include $Al_2O_3$, and $Al_2O_3$ can desirably be included in an amount of 10% by mol or more in said composite particles.

Then, in the catalyst for purifying an exhaust gas of the present invention, an average particle diameter of the composite particles can desirably be 10 μm or less.

BEST MODE FOR CARRYING OUT INVENTION

In the catalyst for purifying an exhaust gas of the present invention, in an $NO_x$ sorption-and-reduction type catalyst which comprises a noble metal and an $NO_x$ sorption member loaded on a porous oxide support, the porous oxide support includes composite particles having a structure comprising a core portion in which $ZrO_2$ is a major component and a superficial portion formed on a surface of the core portion and including an oxide, whose basicity is lower than $ZrO_2$, more than the core portion. Since the composite particles exhibit a basicity, which is lower than $ZrO_2$, at the superficial portion, it is believed $SO_x$ are inhibited from approaching, and accordingly the catalyst for purifying an exhaust gas of the present invention is improved in terms of the sulfur-poisoning resistance. Moreover, similarly to a $ZrO_2$—$Al_2O_3$ composite oxide having a uniform composition, it has the function of improving the steam reforming reaction activity of Rh.

Figure 1:
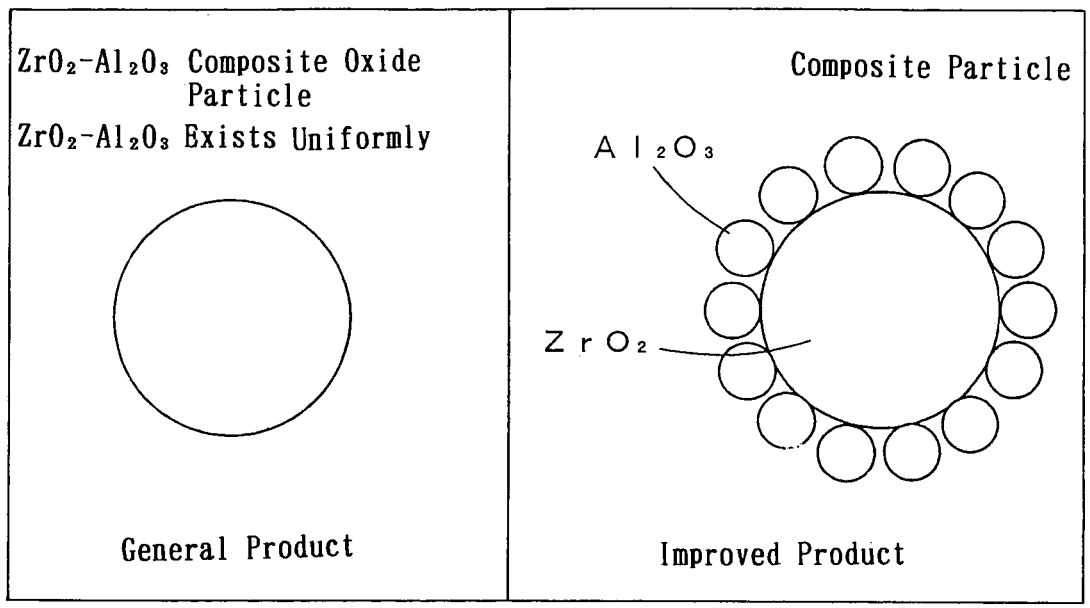
FIG. 1 is an explanatory diagram for schematically illustrating the structures of a general $ZrO_2$—$Al_2O_3$ composite oxide particle and a composite particle which is its improved product.

$Al_2O_3$, $TiO_2$, $SiO_2$, and the like, are exemplified as the oxide whose basicity is lower than $ZrO_2$. For example, a general $ZrO_2$—$Al_2O_3$ composite oxide particle, as illustrated as "General Product" in FIG. 1, is made into a uniform composition from the surface to the inside. However, the composite particle which is used in the present invention, as illustrated as "Improved Product" in FIG. 1, is made into a structure comprising a core portion in which $ZrO_2$ is a major component and a superficial portion formed on a surface of the core portion and including $Al_2O_3$ more than the core portion. The $Al_2O_3$ in the superficial portion can be formed as a fine particle shape or a film shape, but $ZrO_2$ can desirably be exposed partially. Moreover, the $Al_2O_3$ in the superficial portion can desirably exist in a highly dispersed state.

In the composite particle of a structure comprising a core portion in which $ZrO_2$ is a major component and a superficial portion formed on a surface of the core portion and including $Al_2O_3$ more than the core portion, the basicity of the inside is high by the core portion in which $ZrO_2$ is a major component, and the basicity of the superficial portion is low by the $Al_2O_3$ which exists more in the surface of the core portion than in the core portion. Accordingly, the sulfur-poisoning resistance is improved, and, at the same time, although the reason is not clear, the $NO_x$ sorption ability in a high temperature region is improved.

Note that, although both of the particles illustrated in FIG. 1 are a $ZrO_2$—$Al_2O_3$ composite oxide each, in order to distinguish them, the composite oxide particle, whose structure comprises a core portion in which $ZrO_2$ is a major component and a superficial portion formed on a surface of the core portion and including $Al_2O_3$ more than the core portion, is referred to as a composite particle, and the composite oxide particle, whose structure is uniform from the inside to the surface, is referred to as a $ZrO_2$—$Al_2O_3$ composite oxide particle. In order to manufacture the composite particles, for instance, zirconia precursors are precipitated out of a zirconium salt aqueous solution by pH adjustment, and they are calcined to make a $ZrO_2$ powder. To a suspension, in which this $ZrO_2$ powder is mixed in water, an aluminum salt aqueous solution is added, and alumina precursors are precipitated on the surface of the $ZrO_2$ powder by further carrying out pH adjustment. Thereafter, by calcining the resulting deposits, it is possible to manufacture the composite particles whose structure comprises a core portion in which $ZrO_2$ is a major component and a superficial portion formed on a surface of the core portion and including $Al_2O_3$ more than the core portion.

A composition of the composite particles, whose structure comprises a core portion in which $ZrO_2$ is a major component and a superficial portion formed on a surface of the core portion and including $Al_2O_3$ more than the core portion, can desirably fall in a range of $Al_2O_3/ZrO_2=3/97–15/85$ by molar ratio for the entire particles. When the $ZrO_2$ is less than this range, the $NO_x$ sorption ability in a high temperature region lowers, when the $ZrO_2$ is more than this range, the sulfur-poisoning resistance and heat resistance lower.

Moreover, it is desirable to use the composite particles, whose structure comprises a core portion in which $ZrO_2$ is a major component and a superficial portion formed on a surface of the core portion and including $Al_2O_3$ more than the core portion, having an average particle diameter of 10 μm or less. With such an arrangement, it is believed that, in the composite particles in proximity with each other, the probability of contacting the $Al_2O_3$ with each other or the $ZrO_2$ with each other lowers, and it is believed that the different members become partition walls so that the sintering is suppressed. Accordingly, the heat resistance is improved, and it is possible to suppress the lowering of the post-durability specific surface area.

By the way, in an $NO_x$ sorption-and-reduction type catalyst which uses a support in which a Ti—Zr composite oxide is loaded on an $Al_2O_3$ support, the cause that the action of suppressing the sulfur poisoning is not improved so much as expected is believed to lie in that, since the Ti and Zr are dispersed uniformly in the Ti—Zr composite oxide, the inside $TiO_2$ does not function effectively.

Hence, as the oxide whose basicity is lower than $ZrO_2$, it is also preferable to select $TiO_2$, and to use composite particles whose structure comprises a core portion in which $ZrO_2$ is a major component and a superficial portion formed on a surface of the core portion and including $TiO_2$ more than the core portion. In the composite particles, since the $TiO_2$ is included more in the surface, the utility efficiency of $TiO_2$ is improved. Then, since $TiO_2$ has less basic sites so that $SO_x$ are less likely to adsorb thereto, or so that adsorbed $SO_x$ are likely to eliminate therefrom, all in all, the adsorption amount of $SO_x$ is reduced. Moreover, due to the reasons that the contacting interface between the $NO_x$ sorption member and $TiO_2$ increases, and that composite oxide precursors, which are likely to decompose, are thereby formed, adsorbed $SO_x$ are eliminated with ease. By these actions, the suppression action of sulfur poisoning is improved. In addition, in the composite particles, similarly to a Ti—Zr composite oxide, the movement of an alkali component is suppressed, and accordingly the reaction of the alkali component to $TiO_2$ is also suppressed.

Figure 2:
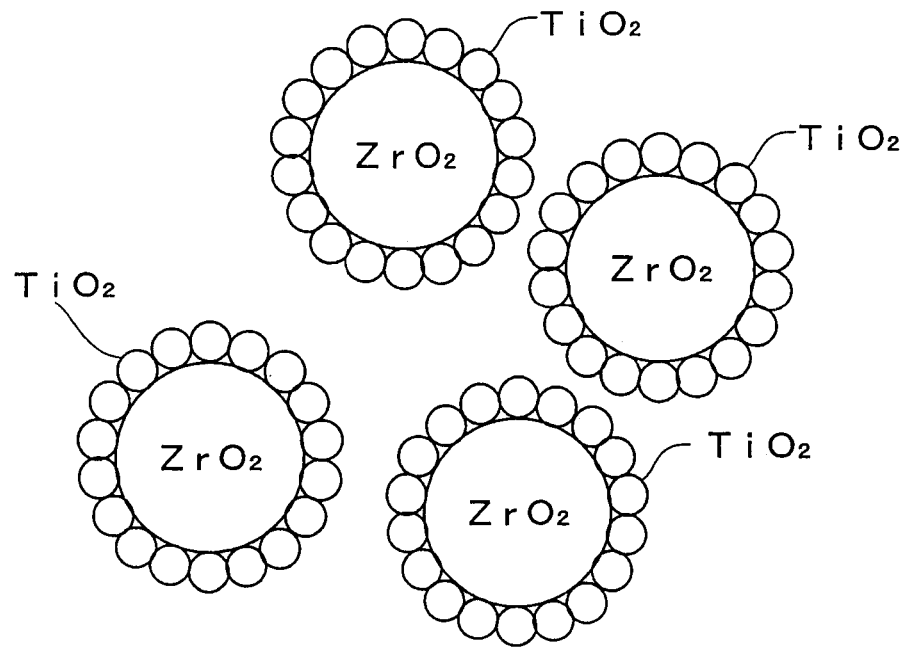
FIG. 2 is an explanatory diagram for schematically illustrating the structure of composite particles which comprise a $ZrO_2$—$TiO_2$ composite oxide.

The composite particles, whose structure comprises a core portion in which $ZrO_2$ is a major component and a superficial portion formed on a surface of the core portion and including $TiO_2$ more than the core portion, are formed as a dual structure as illustrated in FIG. 2. In the composite particles, it is desirable to include $TiO_2$ in an amount of 30% by weight or more in the superficial portion. When the $TiO_2$ in the superficial portion is less than 30% by weight, the sulfur-poisoning-suppression action lowers. Note that, it has been found out that, even when the $TiO_2$ in the superficial portion is too much, the sulfur-poisoning-suppression effect lowers, and accordingly it is desirable to make the $TiO_2$ in the superficial portion less than 80% by weight.

Moreover, it is desired that the composite particles, whose structure comprises a core portion in which $ZrO_2$ is a major component and a superficial portion formed on a surface of the core portion and including $TiO_2$ more than the core portion, can be particles having a particle diameter of 10 μm or less. When the particle diameter exceeds 10 μm, since the surface area of $TiO_2$, which contacts with sulfur components, becomes too small so that the sulfur-poisoning-suppression action lowers. Then, since the smaller the particle diameter is the higher the superficial-portion-occupying rate is, when the particle diameter is 10 µm or less, it is easy for the $TiO_2$ in the superficial portion to occupy 30% by weight or more. In addition, it is believed that, in the composite particles in proximity with each other, the probability of contacting the $TiO_2$ with each other or the $ZrO_2$ with each other lowers, and it is believed that the different members become partition walls so that the sintering is suppressed. Accordingly, the heat resistance is improved, and it is possible to suppress the lowering of the post-durability specific surface area.

In the composite particles whose structure comprises a core portion in which $ZrO_2$ is a major component and a superficial portion formed on a surface of the core portion and including $TiO_2$ more than the core portion, it is desirable to further include $Al_2O_3$. By including $Al_2O_3$, the heat resistance is improved, and it is possible to suppress the lowering of the high-temperature post-durability specific surface area, at the same time, it is possible to suppress the granular growth of noble metal accompanied therewith, and the durability is improved. The $Al_2O_3$ can be included in at least one of the core portion and superficial portion, and is ordinarily included in both of the core portion and superficial portion.

It is desired that the $Al_2O_3$ can be included in an amount of 10% by mol or more. When it is less than 10% by mol, it is difficult to reveal the adding effect. Although the more the content of $Al_2O_3$ is the larger the high-temperature post-durability specific surface area is, since the amount of $TiO_2$ decreases relatively, it is preferable to make the amount of $Al_2O_3$ in a range of 50% by mol or less.

In order to manufacture the composite particles whose structure comprises a core portion in which $ZrO_2$ is a major component and a superficial portion formed on a surface of the core portion and including $TiO_2$ more than the core portion, for instance, zirconia precursors are precipitated out of a zirconium salt aqueous solution by pH adjustment, and they are calcined to make a $ZrO_2$ powder. To a suspension, in which this $ZrO_2$ powder is mixed in water, a titanium salt aqueous solution is added, and titania precursors are precipitated on the surface of the $ZrO_2$ powder by further carrying out pH adjustment. Thereafter, by calcining the resulting deposits, it is possible to manufacture the composite oxide particles whose structure comprises a core portion in which $ZrO_2$ is a major component and a superficial portion formed on a surface of the core portion and including $TiO_2$ more than the core portion. Moreover, in order to further include $Al_2O_3$, an aluminum salt can be solved in one of the zirconium salt and titanium salt aqueous solutions or both of the aqueous solutions.

As the support substrate, it is possible to use one which is formed of heat resistant ceramics, such as cordierite, or a metal, and its shape can be selected from the group consisting of a honeycomb-shaped monolithic type, foam type, pellet type, and so on.

The porous oxide support in the catalyst for purifying an exhaust gas of the present invention can be formed of a powder of the aforementioned composite particles alone, or the other oxide powder, such as $Al_2O_3$, $TiO_2$, $ZrO_2$, $SiO_2$ and $CeO_2$, can be mixed to use. When the other oxide powder is mixed to use, it is desirable to include the composite particles in an amount of 20% by weight or more at least. When the composite particles are less than this, it is difficult to reveal the effects of the improvement of the sulfur-poisoning resistance as well as the improvement of the $NO_x$ sorption ability in a high temperature region.

The catalyst for purifying an exhaust gas of the present invention can be formed as a shape, such as a pellet shape, a honeycomb shape or a foam shape, similarly to the conventional catalysts for purifying an exhaust gas. For example, in order to form it as a pellet shape, it can be molded into a pellet shape out of an $NO_x$ sorption-and-reduction type catalyst powder. Alternatively, it is possible to manufacture it by forming a coating layer on a support substrate out of the aforementioned various porous oxide powders and loading a noble metal and an $NO_x$ sorption member on the coating layer.

It is possible to form the coating layer by a general wash coating method. As a binder in this case, it is possible to use an alumina sol or a zirconia sol, and the like. Further, in the coating layer, it is desirable to include at least one optimum composite particle powder selected from the group consisting of a powder comprising composite particles which have a structure comprising a core portion in which $ZrO_2$ is a major component and a superficial portion formed on a surface of the core portion and including $Al_2O_3$ more than the core portion, a powder comprising composite particles which have a structure comprising a core portion in which $ZrO_2$ is a major component and a superficial portion formed on a surface of the core portion and including $TiO_2$ more than the core portion, or a powder comprising particles further including $Al_2O_3$ in addition to the latter composite particles. Furthermore, in addition to these, it can further include an arbitrary porous oxide powder, such as $Al_2O_3$, $SiO_2$, $ZrO_2$, $TiO_2$ and $CeO_2$. Moreover, it is possible to make an arrangement in which at least one powder selected from the group consisting of the aforementioned optimum composite particle powders is loaded on a coating layer which comprises a porous oxide, such as $Al_2O_3$, $SiO_2$, $ZrO_2$, $TiO_2$ and $CeO_2$. In a case where an arbitrary porous oxide powder coexists, it is desirable to use the optimum composite particle powders in an amount of 20% by weight or more at least. When the optimum composite particle powders are less than this, it is difficult to reveal the effects of the improvement of the sulfur-poisoning resistance as well as the improvement of the $NO_x$ sorption ability in a high temperature region.

It is preferable to form the coating layer in a range of from 150 to 500 g with respect to 1 liter of a support substrate. When the forming amount of the coating layer is less than this, since the loading densities of the noble metal and $NO_x$ sorption member heighten, the durability of the purifying performance lowers, when it is formed more than this, such a drawback arises that the ventilation resistance enlarges.

As the noble metal loaded on the coating layer, it is possible to use one or more members of Pt, Rh, Pd, Ir or Ru. Moreover, as the $NO_x$ sorption member, it is possible to use at least one member selected from the group consisting of alkali metals, alkaline-earth metals and rare-earth elements. Among them, it is preferable to use at least one of alkali metals and alkaline-earth metals which exhibit a high alkalinity and a high $NO_x$ sorption ability.

As the alkali metal, Li, Na, K, Cs, and the like, are exemplified. The alkaline-earth metals refer to the 2A group elements in the periodic table of the elements, and Ba, Be, Mg, Ca, Sr, and so on, are exemplified. Moreover, as the rare-earth element, Sc, Y, La, Ce, Pr, Nd, Dy, Yb, and the like, are exemplified.

The loading amount of the noble metal on the coating layer, in the case of Pt and Pd, can preferably be from 0.1 to 10 g, especially preferably from 0.5 to 10 g, with respect to 1 liter of a support substrate. Further, in the case of Rh, it can preferably be from 0.01 to 10 g, especially preferably from 0.05 to 5 g. Furthermore, the loading amount of the $NO_x$ sorption member can desirably fall in a range of from 0.05 to 1.0 mol with respect to 1 liter of a support substrate. When the loading amount of the $NO_x$ sorption member is less than 0.05 mol/L, the $NO_x$ sorption ability lowers, when it is more than 1.0 mol/L, the sintering of noble metal is promoted.

In a case where the coating layer is formed of a plurality of the porous oxide powders, it is preferable to load Pt and Rh on different types of the porous oxide powders, respectively. With such an arrangement, it is possible to separately load Pt and Rh on different supports, and accordingly it is possible to suppress the lowering of the oxidizing ability of Pt by Rh. Further, it is possible to separately load Rh and the $NO_x$ sorption member, the poorness in the mutual compatibility is not revealed so that the characteristics of the $NO_x$ sorption member and Rh are fully exhibited. Furthermore, when an alkali metal, such as K, is loaded on the composite particles, since not only it is good in terms of the $NO_x$ sorption ability in a high temperature region but also it is improved in terms of the sulfur-poisoning resistance, it is especially preferred.

Then, by using the aforementioned catalyst for purifying an exhaust gas of the present invention, an oxygen-excessive-atmosphere exhaust gas, which has been burned at an air-fuel ratio (A/F) of about 18 or more, is contacted therewith so that $NO_x$, which are contained in the exhaust gas, are sorbed in the $NO_x$ sorption member, and the air-fuel ratio is fluctuated intermittently to be stoichiometric as well as oxygen-excessive so that $NO_x$, which have been released from the $NO_x$ sorption member, are reduced and purified. In an oxygen-excessive atmosphere, NO, which is contained in an exhaust gas, is oxidized on the catalyst to be turned into $NO_x$, and it is sorbed in the $NO_x$ sorption member. Then, when being put into a stoichiometric as well as oxygen-excessive atmosphere, $NO_x$ are released from the $NO_x$ sorption member, and they react with HC and CO, which are contained in the exhaust gas, on the catalyst so that they are reduced.

Then, since the composite particles are included, $SO_x$ are less likely to be adsorbed so that the sulfur poisoning of the $NO_x$ sorption member is suppressed. Moreover, when the composite particles, which have a structure comprising a core portion in which $ZrO_2$ is a major component and a superficial portion formed on a surface of the core portion and including $TiO_2$ more than the core portion, are included, are included, due to such reasons that the interface between the $TiO_2$ and $NO_x$ sorption member enlarges, and that composite oxide precursors, which are likely to decompose, are thereby formed, it is believed that the elimination of adsorbed $SO_x$ becomes more readily, accordingly it is possible to fully suppress the sulfur poisoning of the $NO_x$ sorption member even in post-durability, and it is possible to fully suppress the lowering of the $NO_x$ purifying ability.

Namely, in accordance with the catalyst for purifying an exhaust gas of the present invention, since the sulfur poisoning is suppressed to a higher extent, the durability is improved so that it is possible to stably purify $NO_x$. Moreover, it is good in terms of the $NO_x$ sorption ability in a high temperature region.

EXAMPLES

Hereinafter, the present invention will be described in detail with reference to a testing sample, examples and comparative examples.

Testing Sample

While stirring a zirconium oxynitrate aqueous solution having a concentration of 30% by weight, ammonia water having a concentration of 10% by weight was gradually added so that a molar ratio, Zr: $NH_3$, become 2:3, thereby precipitating zirconia precursors. After filtering and washing the resulting deposits, they were dried at 200° C. for 3 hours, and were calcined at 500° C. for 2 hours, thereby preparing a $ZrO_2$ powder. This $ZrO_2$ powder was mixed into distilled water, while stirring it, a predetermined amount of an aluminum nitrate aqueous solution having a concentration of 30% by weight was stirred and mixed, and ammonia water having a concentration of 10% by weight was added gradually thereto so that a molar ratio, Al:$NH_3$, become 2:3, thereby precipitating alumina precursors on the surface of the $ZrO_2$ powder. After filtering and washing the resulting deposits, they were dried at 200° C. for 3 hours, and were calcined at 500° C. for 2 hours, thereby preparing a $ZrO_2$—$Al_2O_3$ composite oxide powder.

In accordance with the aforementioned manufacturing process, 4 kinds of $ZrO_2$—$Al_2O_3$ composite oxide powders were prepared in which a molar ratio, $ZrO_2$: $Al_2O_3$, was 99:1, 90:10, 80:20, 70:30 by fed composition.

Figure 3:
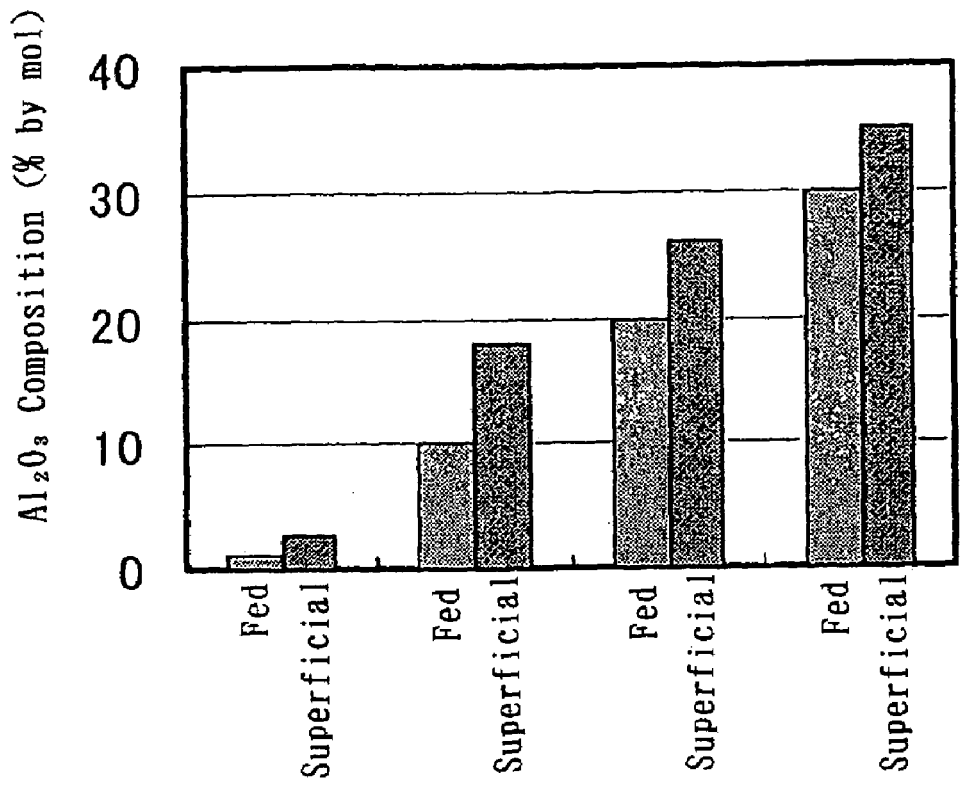
FIG. 3 is a graph for illustrating the fed compositions and superficial compositions of $ZrO_2$—$Al_2O_3$ composite particles which were manufactured in a testing example.

The superficial compositions in the particles of the resulting respective $ZrO_2$—$Al_2O_3$ composite oxide powders were found from the XPS peaks by calculation, and the results are illustrated in FIG. 3. In FIG. 3, the fed compositions were illustrated as well. According to XPS, since it is possible to obtain information in a range of from the surface to a few nm's, it is seen that, in the respective $ZrO_2$—$Al_2O_3$ composite oxide particles, the $Al_2O_3$ compositions in the range of from the surface to a few nm's were greater than the fed values. Namely, in accordance with the aforementioned manufacturing process, it is possible to manufacture composite particles which have a structure comprising a core portion in which $ZrO_2$ is a major component and a superficial portion formed on a surface of the core portion and including $Al_2O_3$ more than the core portion.

Example No. 1

Figure 4:
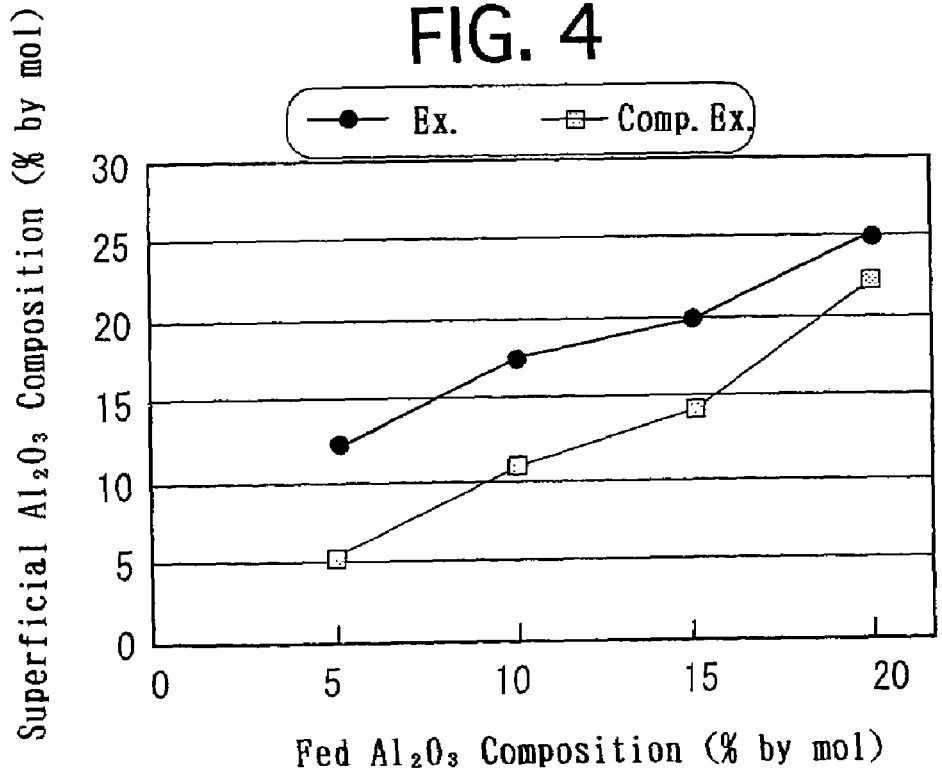
FIG. 4 is a graph for illustrating the relationships between the fed $Al_2O_3$ amounts and superficial $Al_2O_3$ amounts of $ZrO_2$—$Al_2O_3$ composite particles which were used in the catalysts of examples of the present invention and those of comparative examples.

While stirring a zirconium oxynitrate aqueous solution (concentration: 30% by weight), an ammonia aqueous solution (concentration: 10% by weight) was gradually added so that a molar ratio, Zr:$NH_3$=2:3, was established, thereby producing zirconium hydroxide. This suspension was filtered, and, after drying at 200° C. for 3 hours, a $ZrO_2$ powder was obtained by calcining at 500° C. for 2 hours. This $ZrO_2$ powder was charged into distilled water, while stirring it, a predetermined amount of an aluminum nitrate aqueous solution (concentration: 30% by weight) was added, and thereafter an ammonia aqueous solution (concentration: 10% by weight) was added gradually so that a molar ratio, Al:$NH_3$=2:3, was established. This suspension was filtered and dried, and, after drying at 200° C. for 3 hours, a powder comprising $ZrO_2$—$Al_2O_3$ composite particles, which had a structure comprising a core portion in which $ZrO_2$ was a major component and a superficial portion formed on a surface of the core portion and including $Al_2O_3$ more than the core portion, was obtained by calcining at 500° C. for 2 hours. In the $ZrO_2$—$Al_2O_3$ composite particles, $Al_2O_3$ was included in an amount of 5% by mol of the entirety, and their average particle diameter was 8 µm. On the $ZrO_2$—$Al_2O_3$ composite particles, an XPS analysis was carried out, thereby measuring the $Al_2O_3$ amount in the superficial portion (a region including the outermost surface and down to a depth of from 2 to 3 nm). The result is illustrated in FIG. 4.

To 240 parts by weight of the powder comprising the $ZrO_2$—$Al_2O_3$ composite particles, 100 parts by weight of an alumina sol ($Al_2O_3$ was 30% by weight.) and 100 parts by weight of water were mixed to prepare a slurry, after immersing a honeycomb substrate (35 cc), which had a diameter of 30 mm and a length of 50 mm and made from cordierite, thereinto, the honeycomb substrate was pulled up, and, after drying at 250° C. for 15 minutes, a coating layer was formed by calcining at 500° C. for 30 minutes. The coating layer was formed in an amount of 150 g with respect to 1 liter of the honeycomb substrate.

Subsequently, a predetermined amount of a platinum dinitrodiammine aqueous solution was impregnated into the coating layer, Pt was loaded by drying and calcining at 300° C. for 15 minutes. The loading amount of Pt was 2 g with respect to 1 liter of the honeycomb substrate.

Moreover, a predetermined amount of a potassium nitrate aqueous solution was impregnated into the coating layer, K was loaded by drying at 250° C. for 15 minutes and calcining at 300° C. for 30 minutes. The loading amount of K was 0.2 mol with respect to 1 liter of the honeycomb substrate.

Example No. 2

Except that a powder (The production process was the same as Example No. 1.) comprising $ZrO_2$—$Al_2O_3$ composite particles, in which the $Al_2O_3$ amount was 10% by mol, was used, a catalyst of Example No. 2 was prepared in the same manner as Example No. 1. On the used $ZrO_2$—$Al_2O_3$ composite particles, the same XPS analysis as Example No. 1 was carried out, thereby measuring the $Al_2O_3$ amount in the superficial portion. The result is illustrated in FIG. 4.

Example No. 3

Except that a powder (The production process was the same as Example No. 1.) comprising $ZrO_2$—$Al_2O_3$ composite particles, in which the $Al_2O_3$ amount was 15% by mol, was used, a catalyst of Example No. 3 was prepared in the same manner as Example No. 1. On the used $ZrO_2$—$Al_2O_3$ composite particles, the same XPS analysis as Example No. 1 was carried out, thereby measuring the $Al_2O_3$ amount in the superficial portion. The result is illustrated in FIG. 4.

Example No. 4

Except that a powder (The production process was the same as Example No. 1.) comprising $ZrO_2$—$Al_2O_3$ composite particles, in which the $Al_2O_3$ amount was 20% by mol, was used, a catalyst of Example No. 4 was prepared in the same manner as Example No. 1. On the used $ZrO_2$—$Al_2O_3$ composite particles, the same XPS analysis as Example No. 1 was carried out, thereby measuring the $Al_2O_3$ amount in the superficial portion. The result is illustrated in FIG. 4.

Comparative Example No. 1

Zirconium nitrate and aluminum nitrate were solved in distilled water so that their concentrations become 30% by weight, respectively, and, while stirring, an ammonia aqueous solution (concentration: 10% by weight) was added gradually so that a molar ratio, (Zr+Al): $NH_3$=2:3, was established. This solution was filtered, and, after drying at 200° C. for 3 hours, was calcined at 500° C. for 2 hours.

Thus, a powder comprising $ZrO_2$—$Al_2O_3$ composite oxide particles ($Al_2O_3$ was 5% by mol.), which had a uniform composition from the surface to the inside, was prepared. Then, except that the powder comprising the $ZrO_2$—$Al_2O_3$ composite oxide particles instead of the $ZrO_2$—$Al_2O_3$ composite particles, a catalyst of Comparative Example No. 1 was prepared in the same manner as Example No. 1. On the used $ZrO_2$—$Al_2O_3$ composite oxide particles, the same XPS analysis as Example No. 1 was carried out, thereby measuring the $Al_2O_3$ amount in the superficial portion. The result is illustrated in FIG. 4.

Comparative Example No. 2

Except that a powder (The production process was the same as Comparative Example No. 1.) comprising $ZrO_2$—$Al_2O_3$ composite oxide particles ($Al_2O_3$ was 10% by mol.), which had a uniform structure from the surface to the inside, was used instead of the $ZrO_2$—$Al_2O_3$ composite particles, a catalyst of Comparative Example No. 2 was prepared in the same manner as Example No. 1. On the used $ZrO_2$—$Al_2O_3$ composite oxide particles, the same XPS analysis as Example No. 1 was carried out, thereby measuring the $Al_2O_3$ amount in the superficial portion. The result is illustrated in FIG. 4.

Comparative Example No. 3

Except that a powder (The production process was the same as Comparative Example No. 1.) comprising $ZrO_2$—$Al_2O_3$ composite oxide particles ($Al_2O_3$ was 15% by mol.), which had a uniform structure from the surface to the inside, was used instead of the $ZrO_2$—$Al_2O_3$ composite particles, a catalyst of Comparative Example No. 3 was prepared in the same manner as Example No. 1. On the used $ZrO_2$—$Al_2O_3$ composite oxide particles, the same XPS analysis as Example No. 1 was carried out, thereby measuring the $Al_2O_3$ amount in the superficial portion. The result is illustrated in FIG. 4.

Comparative Example No. 4

Except that a powder (The production process was the same as Comparative Example No. 1.) comprising $ZrO_2$—$Al_2O_3$ composite oxide particles ($Al_2O_3$ was 20% by mol.), which had a uniform structure from the surface to the inside, was used instead of the $ZrO_2$—$Al_2O_3$ composite particles, a catalyst of Comparative Example No. 4 was prepared in the same manner as Example No. 1. On the used $ZrO_2$—$Al_2O_3$ composite oxide particles, the same XPS analysis as Example No. 1 was carried out, thereby measuring the $Al_2O_3$ amount in the superficial portion. The result is illustrated in FIG. 4.

Testing and Evaluation

From FIG. 4, since the superficial $Al_2O_3$ amounts were substantially identical with the fed amounts in the $ZrO_2$—$Al_2O_3$ composite oxide particles which were used in the catalysts of the comparative examples, it is supported that they had a uniform composition from the surface to the inside. However, in the $ZrO_2$—$Al_2O_3$ composite particles of the examples, the $Al_2O_3$ amounts of the superficial portions were greater than the fed ratios, and it is understood that the $Al_2O_3$ existed more in the superficial portions. Moreover, the same phenomenon was confirmed by TEM observation, and it is confirmed that, in the $ZrO_2$—$Al_2O_3$ composite particles of the examples, fine-particle-shaped $Al_2O_3$ having a particle diameter of about 2 nm existed in a highly dispersed manner on the surface of $ZrO_2$ particles having a particle diameter of from 20 to 50 nm.

TABLE 1

| | $H_2$ % | NO ppm | $C_3H_6$ ppmC | $CO_2$ % | CO % | $O_2$ % | $SO_2$ ppm | $N_2$ |
|---|---|---|---|---|---|---|---|---|
| Lean | none | 400 | 2500 | 9.5 | 0.1 | 7.0 | 100 | balance |
| Rich | 2.0 | 400 | 3200 | 12 | 6.0 | none | 100 | balance |

Subsequently, the respective catalysts of the examples and comparative examples were put in an evaluating apparatus, and a durability test was carried out in which the model gases set forth in Table 1 were flowed therethrough at a catalyst-inlet temperature of 550° C. in a cycle of 55-second lean gas and 5-second rich gas in a total flow rate of 30 L/min. repeatedly for 3 hours.

Then, on the respective catalysts after the durability test, while flowing model gases, which were prepared by removing $SO_2$ from the model gases set forth in Table 1, therethrough in a total flow rate of 30 L/min., the saturated $NO_x$ sorption amounts at the time of lean were measured at an inlet-gas temperature of 600° C. The results are illustrated in FIG. 5.

Figure 5:
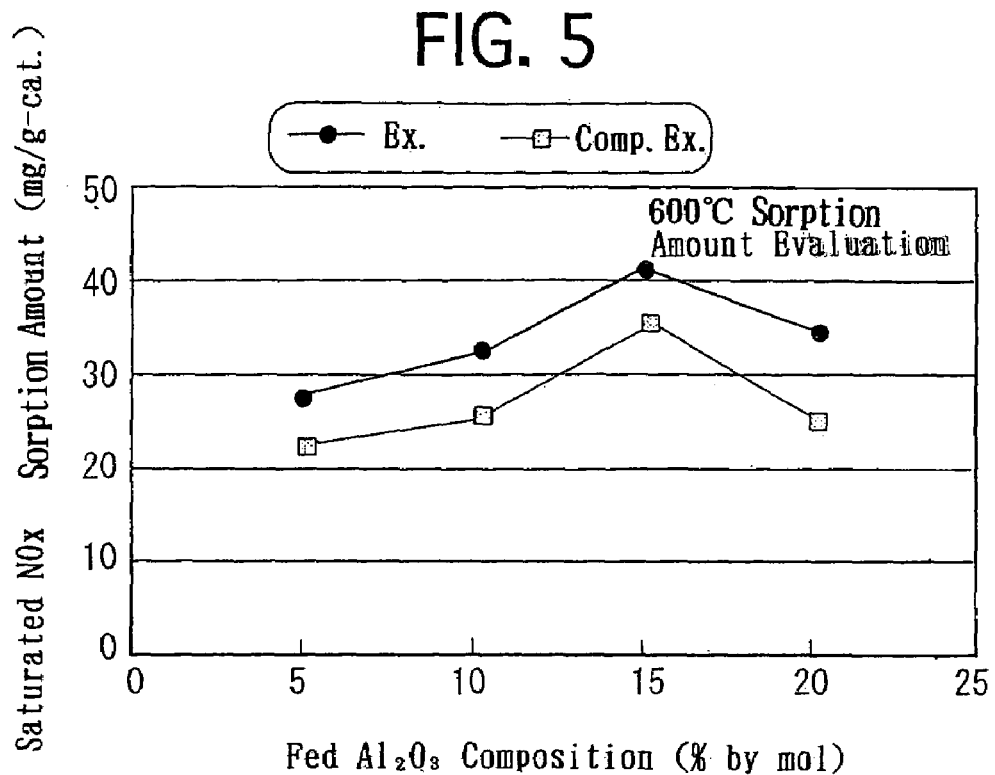
FIG. 5 is a graph for illustrating the saturated $NO_x$ sorption amount of the catalysts of examples of the present invention and those of comparative examples after a durability test.

From FIG. 5, it is seen that the catalysts of the respective examples exhibited the larger post-durability saturated $NO_x$ sorption amounts than the catalysts of the corresponding comparative examples, and it is apparent that this is due to the effect of the sulfur-poisoning suppression by making the $ZrO_2$—$Al_2O_3$ composite particles, in which $Al_2O_3$ was present more in the superficial portions, into the supports. Moreover, there is the peak value adjacent to 15% by mol of the $Al_2O_3$ amount, and accordingly it is seen that it is especially preferable to set the $Al_2O_3$ amount at around 15% by mol.

Example No. 5

Except that powders (The production process was the same as Example No. 1.) comprising $ZrO_2$—$Al_2O_3$ composite particles, which were the same as Example No. 2 except that the average particle diameter differed and in which the $Al_2O_3$ amount was 10% by mol, were used, 5 kinds of catalysts were prepared in the same manner as Example No. 1. These catalysts were put in an evaluating apparatus, and a durability test was carried out in which the model gases set forth in Table 1 were flowed therethrough at a catalyst-inlet temperature of 800° C. in a cycle of 55-second lean gas and 5-second rich gas in a total flow rate of 30 L/min. repeatedly for 3 hours. The specific surface areas after the durability test were measured, respectively, and the results are illustrated in FIG. 6.

Figure 6:
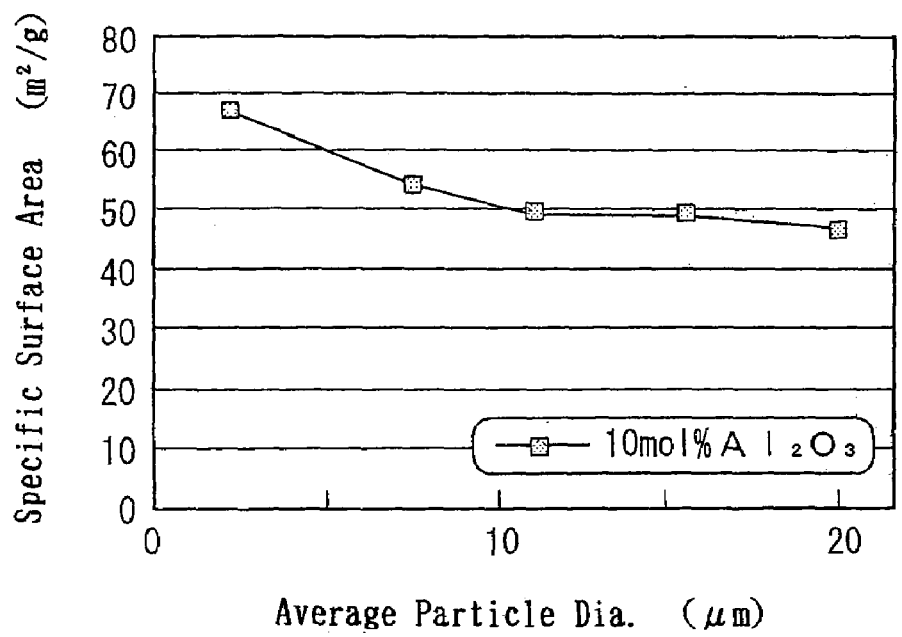
FIG. 6 is a graph for illustrating the relationship between the average particle diameters and specific surfaces areas of $ZrO_2$—$Al_2O_3$ composite particles, which were used in an example, after a durability test.

From FIG. 6, it is seen that the specific surface areas were saturated in a small state when the average particle diameter exceeded 10 μm, and accordingly it is apparent that it is preferable to make the average particle diameter of the $ZrO_2$—$Al_2O_3$ composite particles 10 μm or less.

Example No. 6

While stirring a zirconium oxynitrate aqueous solution (concentration: 30% by weight), an ammonia aqueous solution (concentration: 10% by weight) was gradually added so that a molar ratio, $Zr:NH_3=2:3$, was established, thereby producing zirconium hydroxide being a precursor. This solution was filtered and, after drying at 200° C. for 3 hours, a $ZrO_2$ powder was obtained by calcining at 500° C. for 2 hours. This $ZrO_2$ powder was charged into distilled water, while stirring, a predetermined amount of a titanium chloride aqueous solution (concentration: 30% by weight) was added, and thereafter an ammonia aqueous solution (concentration: 10% by weight) was added gradually so that a molar ratio, $Ti: NH_3=2:3$, was established. This suspension was filtered and washed, and, after drying at 200° C. for 3 hours, a powder comprising $ZrO_2$—$TiO_2$ composite particles, which had a structure comprising a core portion in which $ZrO_2$ was a major component and a superficial portion formed on a surface of the core portion and including $TiO_2$ more than the core portion, was obtained by calcining at 500° C. for 2 hours.

Moreover, precursors were co-precipitated similarly out of a mixture aqueous solution, in which a zirconium oxynitrate aqueous solution (concentration: 30% by weight) and a titanium chloride aqueous solution (concentration: 30% by weight) were mixed in a predetermined rate, after filtering, they were calcined to prepare a $ZrO_2$—$TiO_2$ composite oxide powder, this is charged into distilled water, while stirring, a predetermined amount of titanium chloride aqueous solution (concentration: 30% by weight) was added, and thereafter an ammonia aqueous solution (concentration: 10% by weight) was added gradually so that a molar ratio, $Ti: NH_3=2:3$, was established. Then, by calcining similarly after filtering, a powder comprising $ZrO_2$—$TiO_2$ composite particles, which had a structure comprising a core portion in which $ZrO_2$ was a major component and a superficial portion formed on a surface of the core portion and including $TiO_2$ more than the core portion, was prepared.

Thus, powders were prepared which comprised several kinds of $ZrO_2$—$TiO_2$ composite particles in which the $TiO_2$ amounts in the superficial portions differed variously. The fed compositions, which comprised the respective $ZrO_2$—$TiO_2$ composite particles, were identical so that $TiO_2$ was 30% by weight and $ZrO_2$ was 70% by weight, and the particle diameters were also identical so that they were 5 μm, respectively.

With respect to a predetermined amount of the powders comprising the respective $ZrO_2$—$TiO_2$ composite particles, a predetermined amount of a platinum dinitrodiammine aqueous solution having a predetermined concentration was impregnated, evaporated and dried to solidify, and Pt was loaded by further calcining at 300° C. for 2 hours. Subsequently, a predetermined amount of a barium acetate aqueous solution having a predetermined concentration was impregnated, evaporated and dried to solidify, and Ba was loaded by further calcining at 500° C. for 2 hours. The loading amounts were such that Pt was 2 g and Ba was 0.2 mol with respect to 120 g of the powders comprising the $ZrO_2$—$TiO_2$ composite particles.

The resulting respective catalyst powders were pelletized by an ordinary method, were turned into pellet catalysts, respectively, were filled in an evaluating apparatus, and a model gas, which contained $SO_2$, was flowed therethrough at 600° C. for 3 hours. Then, the weight increments of the catalysts were measured, respectively, and the results of calculating the molar ratios (S/Ba) of $SO_2$, which was reacted with Ba, are illustrated as the sulfur poisoning amount in FIG. 7.

Figure 7:
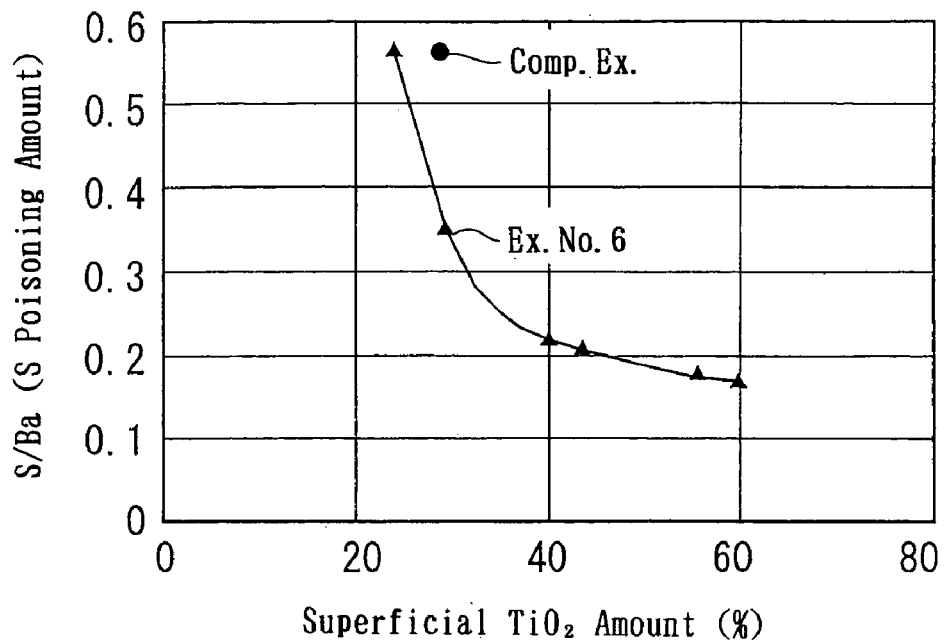
FIG. 7 is a graph for illustrating the relationship between the superficial $TiO_2$ amounts of composite particles and sulfur poisoning amounts of the catalysts of an example.

Note that, as a comparative example, the sulfur poisoning amount was measured similarly on a $ZrO_2$—$TiO_2$ composite oxide powder which had a uniform composition from the surface to the inside, and the result is illustrate in FIG. 7.

From FIG. 7, it is seen that, in the catalysts using the powders which comprised the $ZrO_2$—$TiO_2$ composite particles, the sulfur poisoning amounts were lowered more than the catalyst of the comparative example when the $TiO_2$ amount in the superficial portion was 30% by weight or more, and it is apparent that the more the $TiO_2$ amount in the superficial portion is the greater the sulfur-poisoning-suppression effect is.

Example No. 7

In the same manner as Example No. 6, powders were prepared, respectively, which comprised several kinds of $ZrO_2$—$TiO_2$ composite particles which had a structure comprising a core portion in which $ZrO_2$ was a major component and a superficial portion formed on a surface of the core portion and including $TiO_2$ more than the core portion, and whose average particle diameter differed variously. In order to differ the average particle diameters, the suspension was heated after precipitating zirconium hydroxide, and it was carried out by differing the heating time. Note that the fed compositions of the respective $ZrO_2$—$TiO_2$ composite particles were identical so that $TiO_2$ was 30% by weight and $ZrO_2$ was 70% by weight. The respective superficial compositions were measured by XPS, and the $TiO_2$ amounts (% by weight) in the superficial portions are illustrated in FIG. 8.

By using the respective $ZrO_2$—$TiO_2$ powders, Pt and Ba were loaded in the same manner as Example No. 6, and pellet catalysts were made similarly. Then, in the same manner as Example No. 6, the respective sulfur poisoning amounts were measured, and the results are illustrated in FIG. 8.

Figure 8:
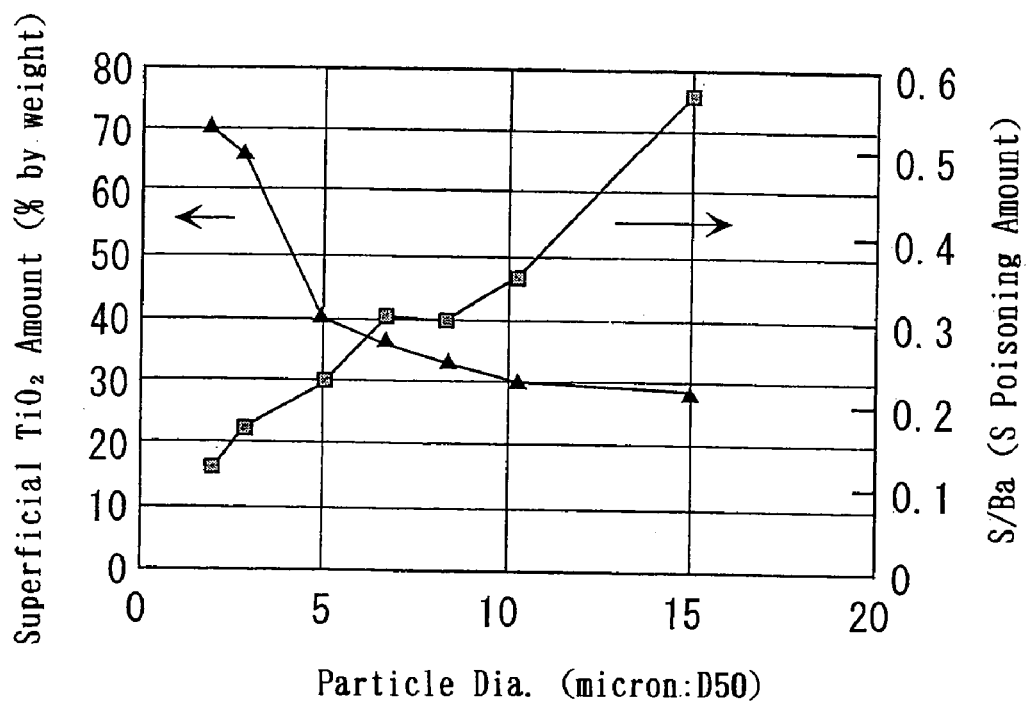
FIG. 8 is a graph for illustrating the relationships between the average particle diameters and the superficial $TiO_2$ amounts of composite particles as well as sulfur poisoning amounts of the catalysts of an example.

From FIG. 8, it is seen that the smaller the particle diameter of the $ZrO_2$—$TiO_2$ composite particles was the larger the $TiO_2$ amount in the superficial portions increased, being accompanied therewith, the sulfur poisoning amount lowered. Then, when the average particle diameter of the $ZrO_2$—$TiO_2$ composite oxide particles is 10 µm or less, the sulfur poisoning amount becomes 0.3 or less so that it falls in a desirable range.

Example No. 8

Composite particles were made which had a structure comprising a core portion in which $ZrO_2$ was a major component and a superficial portion formed on a surface of the core portion and including $TiO_2$ more than the core portion, and in which $Al_2O_3$ was further included, and powders were prepared which comprised several kinds of $ZrO_2$—$TiO_2$—$Al_2O_3$ composite particles in which the $Al_2O_3$ contents differed variously. The preparation was carried out in the same manner as Example No. 6 by further solving aluminum nitrate in the aqueous solution of Example No. 6. In the fed compositions of the respective $ZrO_2$—$TiO_2$—$Al_2O_3$ powders, the weight ratios of $TiO_2$ to $ZrO_2$ were identical so that they were 30/70, and the particle diameters were also identical so that they were 5 µm, respectively.

A durability test was carried out in which the powders comprising the respective $ZrO_2$—$TiO_2$—$Al_2O_3$ composite particles were heated in air at 800° C. for 10 hours, and thereafter the specific surface areas (S.S.A.) were measured, respectively. The results are illustrated in FIG. 9.

Moreover, with respect to a predetermined amount of the powders comprising the respective $ZrO_2$—$TiO_2$—$Al_2O_3$ composite particles, a predetermined amount of a platinum dinitrodiammine aqueous solution having a predetermined concentration was impregnated, evaporated and dried to solidify, and Pt was loaded by further calcining at 300° C. for 2 hours. The loading amount of Pt was 2 g with respect to 120 g of the powders comprising the $ZrO_2$—$TiO_2$—$Al_2O_3$ composite particles.

Figure 10:
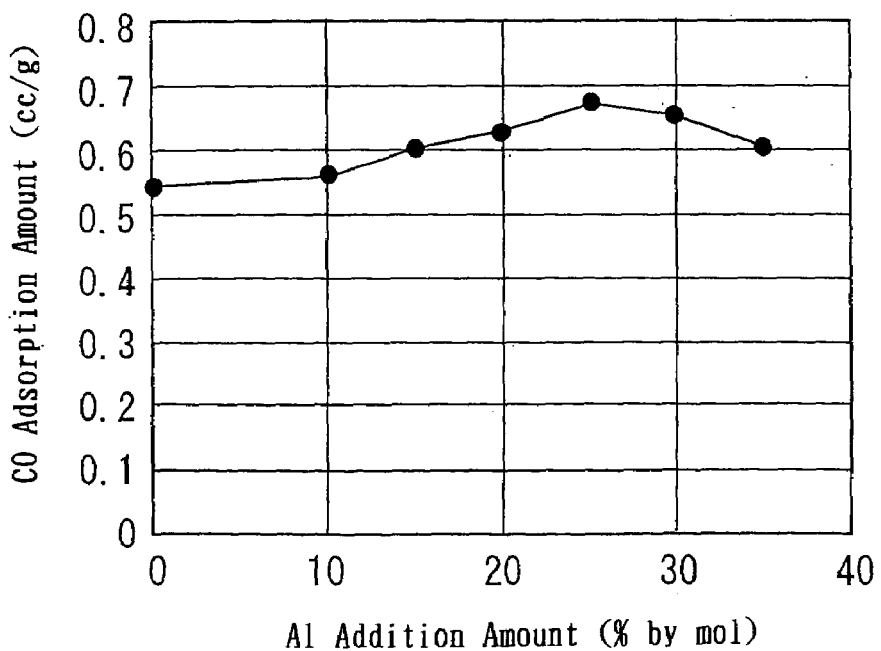
FIG. 10 is a graph for illustrating the relationship between the Al contents of composite particles which were used in the catalysts of an example and the Co adsorption amounts of the catalysts.

A durability test was carried out in which the catalyst powders were heated in air at 600° C. for 10 hours, and thereafter a nitrogen gas, which contained CO, was flowed therethrough, thereby the CO adsorption amounts were measured. The results are illustrated in FIG. 10. Note that, since the CO adsorption amount correlates with the surface area of Pt and since the greater the CO adsorption amount is the smaller the particle diameter of Pt is, the CO adsorption amount is used as an index of the granular growth of Pt.

Figure 9:
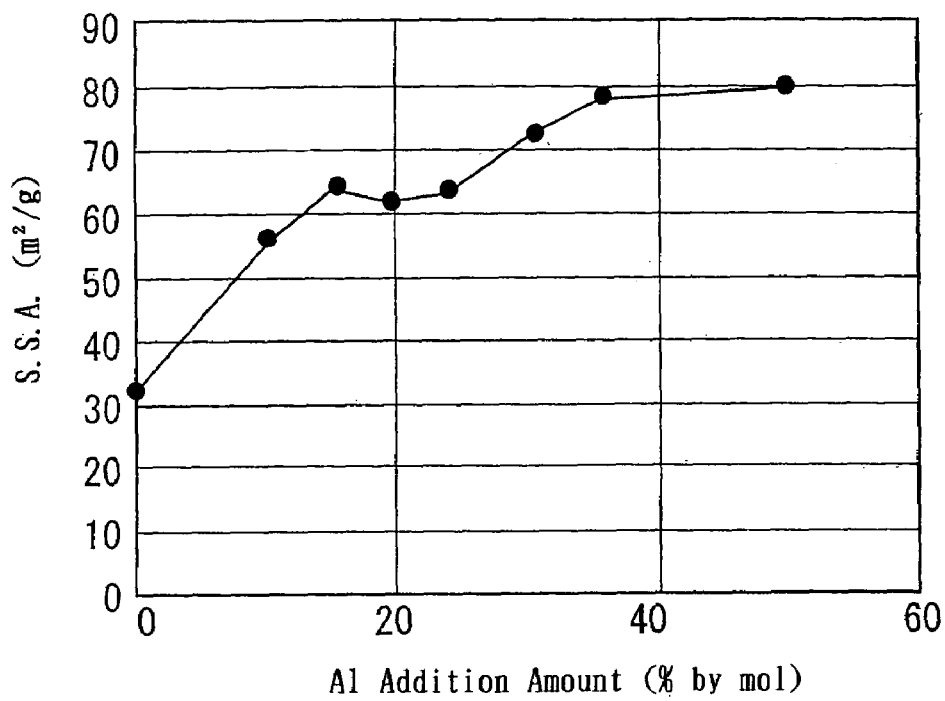
FIG. 9 is a graph for illustrating the relationship between the Al contents and specific surfaces areas of composite particles, which were used in an example, after a durability test.

From FIG. 9, it is seen that the specific surface area enlarged as the content of $Al_2O_3$ increased, and that the heat resistance was improved by the addition of $Al_2O_3$. Then, from FIG. 10, it is seen that the CO adsorption amount enlarged as the $Al_2O_3$ content increased, and that the granular growth of Pt was suppressed as well. Namely, it is believed that the heat resistance of the support was improved by the addition of $Al_2O_3$ so that the decrement of the specific surface area is suppressed even in the high-temperature post-durability and thereby the granular growth of Pt was suppressed as well.

Then, from FIG. 9 and FIG. 10, it is seen that the addition amount of $Al_2O_3$ can desirably be 10% by mol or more.

Example No. 9

By using the same respective $ZrO_2$—$TiO_2$—$Al_2O_3$ composite particles as Example No. 8, pellet catalysts were made on which Pt and Ba were loaded in the same manner as Example No. 6. Then, the sulfur poisoning amounts were measured, respectively, in the same manner as Example No. 6, and the results are illustrated in FIG. 11.

Figure 11:
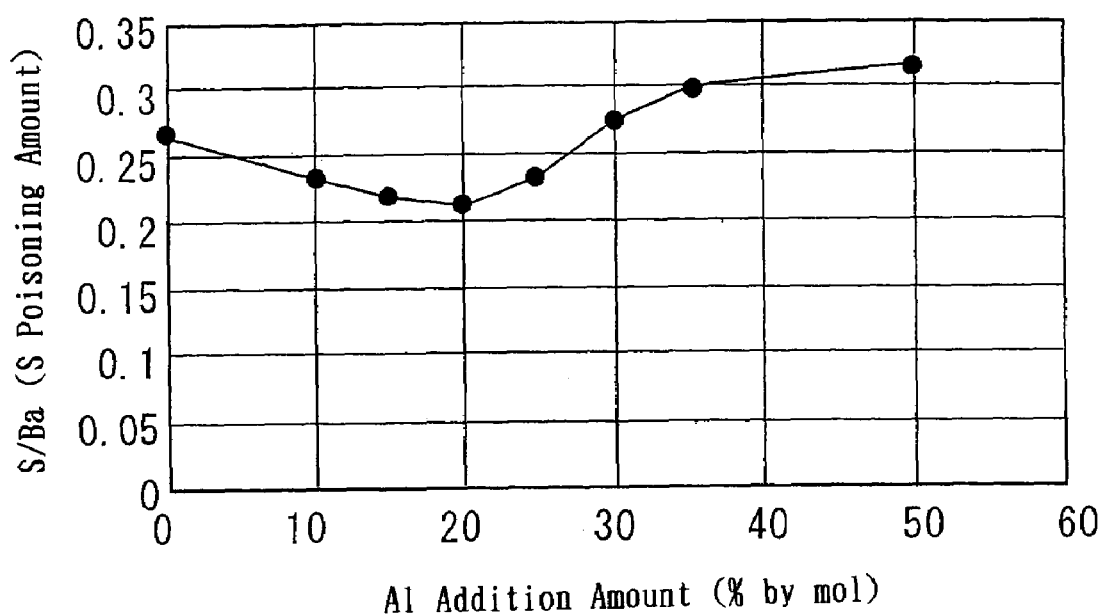
FIG. 11 is a graph for illustrating the relationship between the Al contents of composite particles which were used in the catalysts of an example and the sulfur poisoning amounts of the catalysts.

From FIG. 11, it is seen that, when the content of $Al_2O_3$ falls in a range of 30% by mol or less, the sulfur poisoning amount is as small as 0.3 so that it lies at a practical stage.

The invention claimed is:

1. A $NO_x$ sorption-and-reduction catalyst for purifying an exhaust gas, comprising a noble metal and an $NO_x$ sorption member loaded on a porous oxide support, wherein said porous oxide support includes composite particles having a structure comprising a core portion in which $ZrO_2$ is a major component and a superficial portion comprising an oxide and formed on a surface of the core portion, wherein a basicity of the composite particles is higher in the core portion and is lower in the superficial portion.

2. The catalyst for purifying an exhaust gas as set forth in claim 1, wherein said oxide, having a basicity lower than a basicity of said $ZrO_2$, is $Al_2O_3$, and said composite particles are a $ZrO_2$—$Al_2O_3$ composite oxide.

3. The catalyst for purifying an exhaust gas as set forth in claim 2, wherein a composition of said composite particles falls in a range of $Al_2O_3/ZrO_2$=3/97–15/85 by molar ratio.

4. The catalyst for purifying an exhaust gas as set forth in claim 1, wherein said oxide, having a basicity lower than a basicity of said $ZrO_2$, is $TiO_2$, and said composite particles are a $ZrO_2$—$TiO_2$ composite oxide.

5. The catalyst for purifying an exhaust gas as set forth in claim 4, wherein $TiO_2$ is included in an amount of 30% by weight or more in the superficial portion of said composite particles.

6. The catalyst for purifying an exhaust gas as set forth in claim 5, wherein said composite particles further include $Al_2O_3$ in at least one of the core portion and the superficial portion.

7. The catalyst for purifying an exhaust gas as set forth in claim 4, wherein said composite particles further include $Al_2O_3$ in at least one of the core portion and the superficial portion.

8. The catalyst for purifying an exhaust gas as set forth in claim 7, wherein said $Al_2O_3$ is included in an amount of 10% by mol or more in said composite particles.

9. The catalyst for purifying an exhaust gas as set forth in claim 1, wherein an average particle diameter of said composite particles is 10 μm or less.

10. A NOx sorption-and-reduction catalyst for purifying an exhaust gas, comprising:
    a support substrate,
    a coating layer formed on the support substrate comprising a porous oxide support, and a noble metal and at least one NOx sorption member are loaded on the coating layer, wherein the NOx sorption member being selected from the group consisting of alkali metals, alkaline-earth metals and rare-earth elements, said porous oxide support includes composite particles, having a structure comprising a core portion in which $ZrO_2$ is a major component and a superficial portion comprising an oxide and formed on a surface of the core portion, wherein a bacisity of the composite particles is higher in the core portion and is lower in the superficial portion.

11. The catalyst for purifying an exhaust gas as set forth in claim 10, wherein said oxide, having a basicity lower than a basicity of said $ZrO_2$, is $Al_2O_3$, and said composite particles are a $ZrO_2$—$Al_2O_3$ composite oxide.

12. The catalyst for purifying an exhaust gas as set forth in claim 10, wherein a composition of said composite particles falls in a range of $Al_2O_3/ZrO_2$=3/97–15/85 by molar ratio.

13. The catalyst for purifying an exhaust gas as set forth in claim 10, wherein said oxide, having a basicity lower than a basicity of said $ZrO_2$, is $TiO_2$, and said composite particles are a $ZrO_2$—$TiO_2$ composite oxide.

14. The catalyst for purifying an exhaust gas as set forth in claim 13, wherein $TiO_2$ is included in an amount of 30% by weight or more in the superficial portion of said composite particles.

15. The catalyst for purifying an exhaust gas as set forth in claim 14, wherein said composite particles further include $Al_2O_3$ in at least one of the core portion and the superficial portion.

16. The catalyst for purifying an exhaust gas as set forth in claim 13, wherein said composite particles further include $Al_2O_3$ in at least one of the core portion and the superficial portion.

17. The catalyst for purifying an exhaust gas as set forth in claim 16, wherein said $Al_2O_3$ is included in an amount of 10% by mol or more in said composite particles.

18. The catalyst for purifying an exhaust gas as set forth in claim 10, wherein an average particle diameter of said composite particles is 10 μm or less.

* * * * *

UNITED STATES PATENT AND TRADEMARK OFFICE
CERTIFICATE OF CORRECTION

PATENT NO. : 7,220,702 B2
APPLICATION NO. : 10/468354
DATED : May 22, 2007
INVENTOR(S) : Naoyuki Hara and Ichiro Hachisuka It is certified that error appears in the above-identified patent and that said Letters Patent is hereby corrected as shown below:

In claim 12, column 18, line 4, "in claim 10" should read --in claim 11--.

Signed and Sealed this

Seventh Day of August, 2007

JON W. DUDAS
*Director of the United States Patent and Trademark Office*